(12) United States Patent
John et al.

(10) Patent No.: US 11,924,449 B2
(45) Date of Patent: Mar. 5, 2024

(54) MULTIVARIATE RATE CONTROL FOR TRANSCODING VIDEO CONTENT

(71) Applicant: Google LLC, Mountain View, CA (US)

(72) Inventors: Sam John, Dublin, CA (US); Balineedu Adsumilli, Sunnyvale, CA (US); Akshay Gadde, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/908,352

(22) PCT Filed: May 19, 2020

(86) PCT No.: PCT/US2020/033540
§ 371 (c)(1),
(2) Date: Aug. 31, 2022

(87) PCT Pub. No.: WO2021/236060
PCT Pub. Date: Nov. 25, 2021

(65) Prior Publication Data
US 2023/0101806 A1 Mar. 30, 2023

(51) Int. Cl.
*H04N 19/40* (2014.01)
*H04N 19/119* (2014.01)
(Continued)

(52) U.S. Cl.
CPC .......... *H04N 19/40* (2014.11); *H04N 19/119* (2014.11); *H04N 19/147* (2014.11); *H04N 19/184* (2014.11); *H04N 19/192* (2014.11)

(58) Field of Classification Search
CPC .... H04N 19/40; H04N 19/119; H04N 19/147; H04N 19/184; H04N 19/192; H04N 19/14; H04N 19/179; H04N 19/196
See application file for complete search history.

(56) References Cited

U.S. PATENT DOCUMENTS 8,897,370 B1 * 11/2014 Wang .................. H04N 19/139
375/240.2
10,419,773 B1 * 9/2019 Wei ........................ H04N 19/46
(Continued)

OTHER PUBLICATIONS

Patrick Le Callet, "On Perceptual Coding: Quality, Content Features and Complexity", AOMedia Symposium 2019, 47 pgs.
(Continued)

*Primary Examiner* — Tracy Y. Li
(74) *Attorney, Agent, or Firm* — Young Basile Hanlon & MacFarlane, P.C.

(57) ABSTRACT

A learning model is trained for rate-distortion behavior prediction against a corpus of a video hosting platform and used to determine optimal bitrate allocations for video data given video content complexity across the corpus of the video hosting platform. Complexity features of the video data are processed using the learning model to determine a rate-distortion cluster prediction for the video data, and transcoding parameters for transcoding the video data are selected based on that prediction. The rate-distortion clusters are modeled during the training of the learning model, such as based on rate-distortion curves of video data of the corpus of the video hosting platform and based on classifications of such video data. This approach minimizes total corpus egress and/or storage while further maintaining uniformity in the delivered quality of videos by the video hosting platform.

20 Claims, 13 Drawing Sheets

(51) Int. Cl.
*H04N 19/147* (2014.01)
*H04N 19/184* (2014.01)
*H04N 19/192* (2014.01)

(56) References Cited

U.S. PATENT DOCUMENTS

| | | | | |
|---|---|---|---|---|
| 10,623,775 | B1* | 4/2020 | Theis | G06N 3/045 |
| 11,259,040 | B1* | 2/2022 | Sabui | H04N 19/46 |
| 2006/0222078 | A1 | 10/2006 | Raveendran | |
| 2012/0275511 | A1* | 11/2012 | Shemer | H04N 19/14 |
| | | | | 375/E7.126 |
| 2015/0063436 | A1* | 3/2015 | Lasserre | H04N 19/19 |
| | | | | 375/240.2 |
| 2017/0078676 | A1 | 3/2017 | Coward et al. | |
| 2018/0109799 | A1 | 4/2018 | De Cock et al. | |
| 2020/0273040 | A1* | 8/2020 | Novick | H04W 12/122 |
| 2021/0049757 | A1* | 2/2021 | Zhu | G06T 7/32 |

OTHER PUBLICATIONS

Y. Wang, S. Inguva, and B. Adsumili, "YouTube UGC Dataset for Video Compression Research," in IEEE International Workshop on Multimedia Signal Processing, 2019, 5 pgs.

M. Seufert, S. Egger, M. Slanina, T. Zinnder, T. Hoβfeld, and P. Tran-Gia, "A Survey on Quality of Experience of HTTP Adaptive Streaming," IEEE Communications Surveys Tutorials, 2015, pp. 469-492.

A. Ortega and K. Ramchandran, "Rate-Distortion Methods for Image and Video Compression," IEEE Signal Processing Magazine, Nov. 1998, pp. 23-50.

L. Toni, R. Aparicio-Pardo, K. Pires, G. Simon, A. Blanc, and P. Frossard, "Optimal Selection of Adaptive Streaming Representations," ACM Trans. Multimedia Comput. Commun. Appl., vol. 11, No. 2s, Article 43, Feb. 2015, 26 pgs.

C. Chen, Y. Lin S. Benting, and A. Kokaram, "Optimized Transcoding For Large Scale Adaptive Streaming Using Playback Statistics," IEEE International Conference on Image Processing, Oct. 2018, pp. 3269-3273.

Y. Chen, D. Murherjee, J. Han, A. Grange, Y. Xu, Z. Liu, S. Parker, C. Chen, H. Su, U. Joshi, et al., "An Overview of Core Coding Tools in the AV1 Video Codec," in IEEE Picture Coding Symposium 2018, pp. 41-45.

S. Ling, Y. Baveye, P. Le Callet, J. Skinner, and I. Katsavounidis, "Characterization of User Generated Content for Perceptually-Optimized Video Compression: Challenges, Observations and Perspectives," Human Vision and Electronic Imaging 2020, 48 pgs.

C.- C. Chang and C.- J. Lin, "LIBSVM: A library for support vector machines," ACM Transactions on Intelligent Systems and Technology, vol. 2, No. 3, Article 27, Apr. 2011, 27 pgs.

International Search Report and Written Opinion of International Application No. PCT/US2020/03354 dated Dec. 15, 2020, 14 pgs.

YouTube Engineering and Developers Blog: Making high quality video efficient, Apr. 24, 2018, 8 pgs.

* cited by examiner

MULTIVARIATE RATE CONTROL FOR TRANSCODING VIDEO CONTENT

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A method for transcoding an input video stream according to an implementation of this disclosure comprises receiving the input video stream at a server of a video hosting platform, in which the input video stream includes a current video chunk. One or more complexity features of the current video chunk are then identified. Using a learning model trained based on a corpus of the video hosting platform, a rate-distortion cluster prediction is determined for the current video chunk based on the one or more complexity features. Transcoding parameters for the current video chunk are then selected based on the rate-distortion cluster prediction, and the current video chunk is then transcoded according to the transcoding parameters.

In some implementations of the method, the rate-distortion cluster prediction corresponds to one of a plurality of rate-distortion clusters identifiable using the learning model, and each rate-distortion cluster of the plurality of rate-distortion clusters corresponds to a different rate-distortion classification of videos of the corpus of the video hosting platform.

In some implementations of the method, determining the rate-distortion cluster prediction for the current video chunk based on the one or more complexity features comprises identifying a rate-distortion classification of the current video chunk, and determining the rate-distortion cluster prediction based on a correspondence between the rate-distortion classification of current video chunk and the rate-distortion classification of a rate-distortion cluster of the plurality of rate-distortion clusters.

In some implementations of the method, the method further comprises training the learning model to predict rate-distortion behavior of video data using videos within the corpus of the video hosting platform.

In some implementations of the method, training the learning model to predict the rate-distortion behavior of the video data using the videos within the corpus of the video hosting platform comprises receiving a training data set including training video data from at least some of the videos within the corpus of the video hosting platform, determining rate-distortion curves for the training video data, and producing rate-distortion clusters by clustering the rate-distortion curves based on similarities of complexity features of the training video data.

In some implementations of the method, the method further comprises determining a centroid curve for each of the rate-distortion clusters, in which the centroid curve determined for each of the rate-distortion clusters includes a number of operating points, and in which each operating point represents a bitrate available for transcoding and a quality resulting from using the bitrate.

In some implementations of the method, selecting the transcoding parameters for the current video chunk based on the rate-distortion cluster prediction comprises identifying, as an optimal operating point, one of the number of operating points of a centroid curve for a rate-distortion cluster corresponding to the rate-distortion cluster prediction, and selecting, as the transcoding parameters, parameters corresponding to the optimal operating point.

In some implementations of the method, identifying the one or more complexity features of the current video chunk comprises extracting the one or more complexity features of the current video chunk from a pass log of an encoder used for encoding the input video stream.

In some implementations of the method, the pass log is received after a first pass encoding by the encoder and the method further comprises verifying the selection of the transcoding parameters before a second pass encoding by the encoder.

In some implementations of the method, verifying the selection of the transcoding parameters before the second pass encoding by the encoder comprises determining whether the transcoding of the current video chunk using the transcoding parameters is in accordance with one or more transcoder constraints, and, responsive to a determination that the transcoding of the current video chunk using the transcoding parameters is not in accordance with the one or more transcoder constraints, causing a selection of different transcoding parameters for transcoding the current video chunk.

An apparatus for transcoding an input video stream according to an implementation of this disclosure comprises a server of a video hosting platform. The server including a memory and a processor, in which the processor is configured to execute instructions stored in the memory. The instructions include instructions to determine one or more complexity features of video data of the input video stream. Using a learning model trained based on a corpus of the video hosting platform, a correspondence of the video data to a rate-distortion cluster is determined based on the one or more complexity features of the video data. The video data is then transcoded according to transcoding parameters selected based on operating points of a centroid curve of the rate-distortion cluster.

In some implementations of the apparatus, the rate-distortion cluster is one of a plurality of rate-distortion clusters identifiable using the learning model, in which each rate-distortion cluster of the plurality of rate-distortion clusters corresponds to a different rate-distortion classification of videos of the corpus of the video hosting platform, and the instructions to determine the correspondence of the video data to the rate-distortion cluster based on the one or more complexity features of the video data include instructions to predict that rate-distortion behavior of the video data is similar to rate-distortion behavior of videos used to produce the rate-distortion cluster based on a rate-distortion classification of the video data and based on a rate-distortion classification of video content to which the rate-distortion cluster corresponds.

In some implementations of the apparatus, the instructions include instructions to train the learning model to predict rate-distortion behavior using a training data set including at least some videos within the corpus of the video hosting platform.

In some implementations of the apparatus, the instructions to train the learning model to predict the rate-distortion behavior using the training data set including the at least some videos within the corpus of the video hosting platform include instructions to determine rate-distortion curves for video data of the training data set, produce rate-distortion clusters by clustering the rate-distortion curves based on similarities of complexity features of video data of the training data set, and determine a centroid curve for each of the rate-distortion clusters, in which the centroid curve determined for each of the rate-distortion clusters includes a number of operating points, and in which each operating point represents a bitrate available for transcoding and a quality resulting from using the bitrate.

In some implementations of the apparatus, a number of the rate-distortion clusters produced is empirically determined based on variations in rate-distortion characteristics across the corpus of the video hosting platform.

In some implementations of the apparatus, the instructions to determine the one or more complexity features of the video data of the input video stream include instructions to derive the one or more complexity features from an encoder pass log.

In some implementations of the apparatus, the instructions to determine the one or more complexity features of the video data of the input video stream include instructions to derive the one or more complexity features from one or more feature maps generated for the input video stream.

A transcoder for transcoding an input video stream according to an implementation of this disclosure comprises a rate-distortion predictor stage and a rate-distortion optimizer stage. The rate-distortion predictor stage is configured to process complexity features of video data of the input video stream using a learning model to determine a rate-distortion cluster prediction for the video data of the input video stream, in which the learning model is trained, based on a corpus of a video hosting platform, to determine the rate-distortion cluster prediction for the video data of the input video stream based on a rate-distortion classification of the video data. The rate-distortion optimizer stage is configured to select transcoding parameters for transcoding the video data of the input video stream based on the rate-distortion cluster prediction, in which the transcoding parameters are defined based on an operating point along a rate-distortion curve corresponding to the rate-distortion cluster prediction.

In some implementations of the transcoder, the rate-distortion predictor stage is further configured to train the learning model using a training data set including video data of the corpus of the video hosting platform by determining rate-distortion curves for the training data set and producing rate-distortion clusters by clustering the rate-distortion curves based on complexity features of the training data set, in which the rate-distortion cluster prediction for the video data of the input video stream corresponds to one of the rate-distortion clusters.

In some implementations of the transcoder, the transcoding parameters are selected for the input video stream at the rate-distortion optimizer stage to minimize a total or an average of bitrates used for transcoding videos of the corpus of the video hosting platform subject to quality constraints associated with the rate-distortion clusters.

These and other aspects of this disclosure are disclosed in the following detailed description of the implementations, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
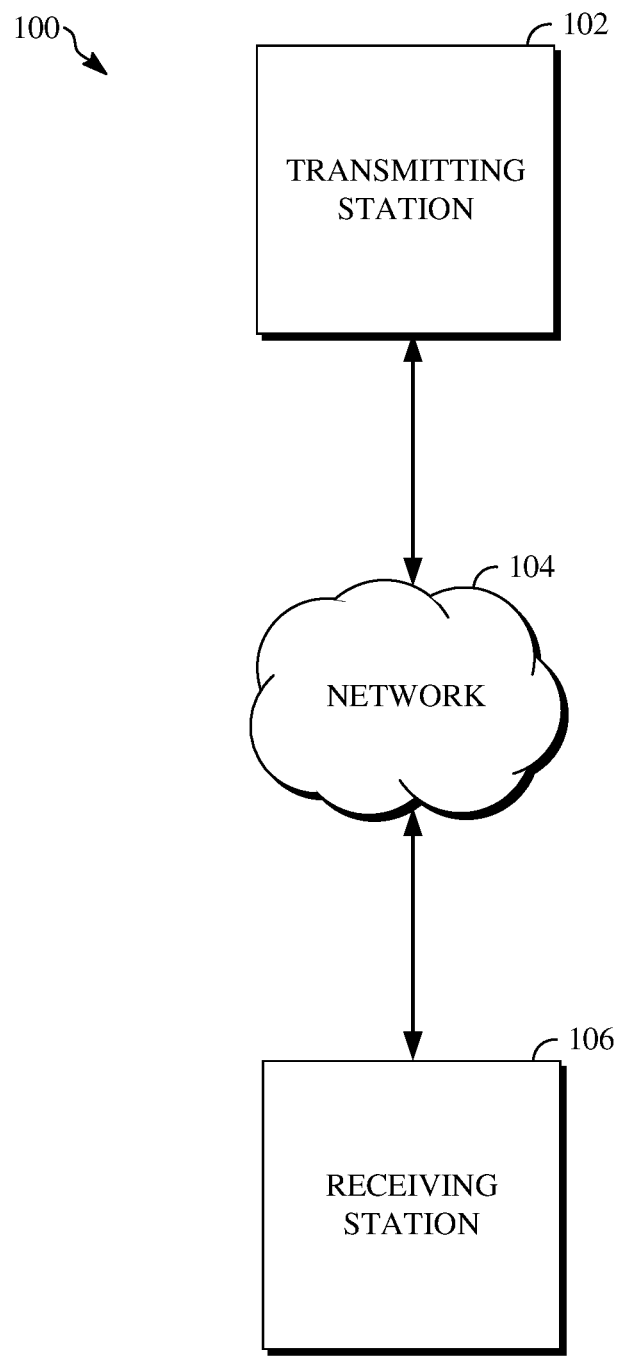
FIG. 1 is a schematic of an example of a video encoding and decoding system.

Video compression schemes may include breaking respective images, or frames, into smaller portions, such as blocks, and generating a compressed bitstream using techniques to limit the information included for respective blocks in the output. The compressed bitstream can be decoded to re-create the source images from the limited information, with some loss which is generally not perceivable to the viewer. Typical video compression techniques include reducing the bitrate of a video stream, such as to reduce transmission costs for video hosting and serving platforms. Compression may be performed as part of or otherwise in connection with the transcoding of video content, such as to convert aspects of the video content from one format to another. For example, when video content, such as user generated video content or other video content, is uploaded to a video hosting platform, a video stream representing the video content may be compressed and transcoded for later viewing on the video hosting platform.

Video hosting platforms conventionally transcode uploaded video content into multiple target resolutions before serving the video content to platform users. For example, a video received at a resolution of 1080p may be transcoded into 360p, 480p, 720p, and possibly other resolution formats. When a user of such a video hosting platform requests to view a hosted video, the platform selects a target format to serve to the user based on input criteria such as network conditions and user device capabilities. In some cases, the platform may select the target format expected to deliver the highest quality of the video to the user based on those input criteria. For example, where a user's network conditions and user device capabilities are able to support a 1080p resolution format of a video, the video hosting platform may serve that format version. This is because the higher resolution is associated with a higher playback quality and further because the relatively high bitrate requirements required to support playback at that resolution are attainable by the user's network conditions and user device capabilities.

Conventional transcoding approaches thus rely upon fixed rate control thresholds to set bitrate and quality targets for transcoding. However, the use of such fixed rate control thresholds suffers from several drawbacks. First, because the typical goal of video coding is to ensure that an encoded video is restored as close as possible to its original form after decoding, the rate control statistics are generally insufficient for transcoding when the original video quality is low. Second, rate control techniques of conventional codecs are not tuned for stable streaming purposes and, when applied at a chunk-level, end up either overshooting or undershooting bitrate and quality targets. Third, transcoding efficiency may rely upon the specific content of a video, but there is no one-size-fits-all approach for collecting these control statistics across the wide variety of video content classifications.

Figure 7:
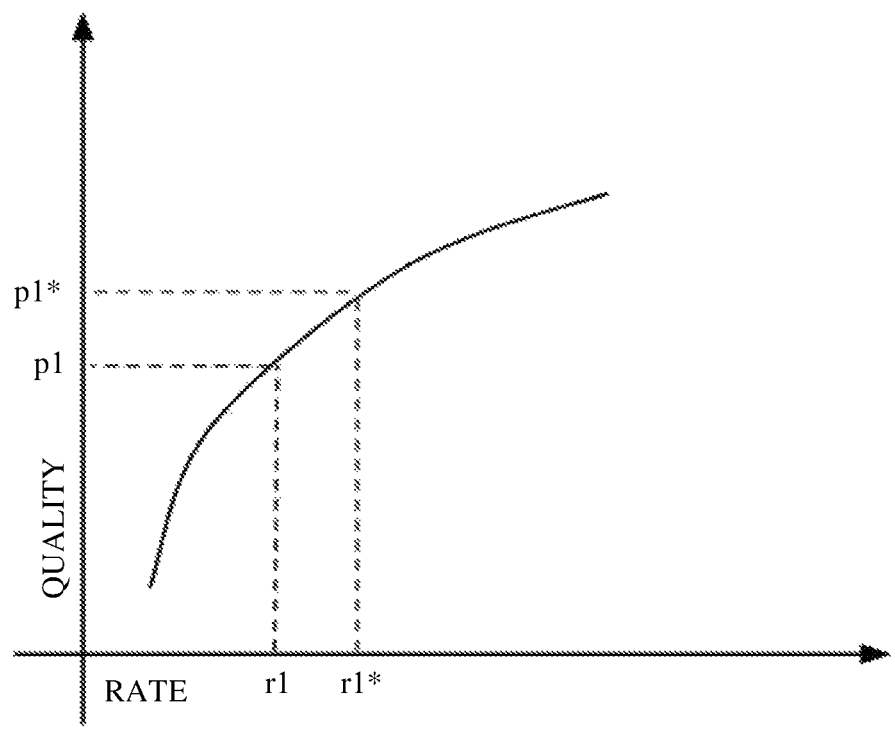
FIG. 7 is an illustration of a rate-distortion curve for first video data of a video hosting platform corpus.
Figure 8:
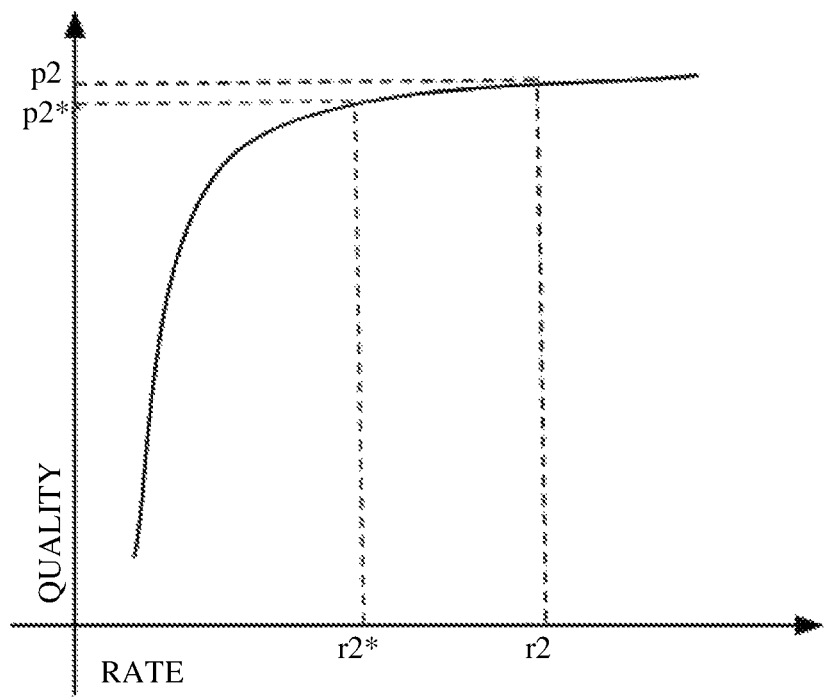
FIG. 8 is an illustration of a rate-distortion curve for second video data of a video hosting platform corpus.

This problem may further be expressed with reference to FIGS. 7 and 8, and by defining the number of chunks in a video hosting platform's corpus as N and the number of bytes available for transcoding as R, in which the corpus refers to some or all videos hosted by the video hosting platform, regardless of content or classification. FIG. 7 is an illustration of a rate-distortion curve for first video data (e.g., a first video chunk) of a video hosting platform corpus. FIG. 8 is an illustration of a rate-distortion curve for second video data (e.g., a second video chunk) of a video hosting platform corpus. The rate-distortion curve of a video can be determined by encoding the video at different bitrates and plotting the distortion achieved at each bitrate. In each of FIGS. 7 and 8, the X-axis represents the rate, defined as R, as the Y-axis represents the quality, defined as P, measured using peak signal to noise ratio (PSNR). The best allocation presents when the slope of a rate-distortion curve at selected operating points is the same for all chunks. To optimize for storage, a transcoder could select the operating points ($R_i$, $P_i$) or ($R_i^*$, $P_i^*$) (e.g., either ($R_1$, $P_1$) or ($R_1^*$, $P_1^*$) for the curve of FIG. 7 and either ($R_2$, $P_2$) or ($R_2^*$, $P_2^*$) for the curve of FIG. 8). It is evident from this that the operating points ($R_1^*$, $P_1^*$) and ($R_2^*$, $P_2^*$) are more optimal in this one example.

To maximize coding efficiency, it would be particularly desirable for a transcoder to use rate-distortion curves calculated for video chunks. However, sampling rate-distortion curves involves encoding each video chunk at multiple bitrates. Considering that an input video stream for transcoding has many video chunks and that a video hosting platform's corpus may in some cases include billions of videos spanning a wide variety of different content classifications, the number of rate-distortion curves which must be calculated becomes so high that the computation expense of this type of processing is rendered infeasible.

Furthermore, in the streaming context, conventional applications use either variable bitrate or constrained quality techniques for rate control to maintain uniformity in the delivered quality of videos. However, as the corpus of videos becomes very large, and particularly when the videos of the corpus span increasing numbers of content classifications, it becomes difficult to maintain uniformity in the delivered quality of videos. One solution to this is to use ad hoc methods for setting quality and bitrate thresholds by optimizing rate allocations directly over all videos in a large corpus; however, this solution addresses fails to optimize bitrate allocation globally by considering video content complexity, and such a solution assumes that the rate-distortion curves for all videos in the corpus are known and that the number of encoding bitrates to optimize is small. Those assumptions are infeasible for rate-distortion optimization over a large scale corpus.

Implementations of this disclosure address problems such as these by allocating bitrates for video chunks in a large scale corpus of a video hosting platform to minimize average bitrate while maintaining aggregate quality. A learning model is trained for rate-distortion behavior prediction against a corpus of a video hosting platform and used to determine optimal bitrate allocations for video data given video content complexity across the corpus of the video hosting platform. Complexity features of the video data are processed using the learning model to determine a rate-distortion cluster prediction for the video data, and transcoding parameters for transcoding the video data are selected based on that prediction. The rate-distortion clusters are modeled during the training of the learning model, such as based on rate-distortion curves of video data of the corpus of the video hosting platform and based on classifications of such video data. This approach minimizes total corpus egress and/or storage while further maintaining uniformity in the delivered quality of videos by the video hosting platform.

In some implementations, a transcoder according to this disclosure includes a rate-distortion predictor stage and a rate-distortion optimizer stage, which may be implemented in separate software modules or tools or in the same software module or tool. The rate-distortion predictor stage is configured to predict the rate-distortion behavior of video data, such as video chunks, by using a learning model to determine which of a number of rate-distortion clusters the video data corresponds to. The learning model is trained including by using supervised learning where cluster labels refer to rate-quality cluster identifiers and complexity features are obtained from videos, and by using unsupervised learning wherein cluster labels are determined by video chunk clustering. The rate-distortion optimizer stage is configured to determine an optimal bit allocation for a given video chunk using a global approach based on statistics for an entire corpus, such as by selecting transcoding parameters for transcoding the video data based on the rate-distortion cluster prediction determined at the rate-distortion predictor stage. This approach minimizes total corpus egress and/or storage while further maintaining uniformity in the delivered quality of videos.

As used herein, the learning model may be a machine learning model. For example, the machine learning model may be or include one or more of a neural network (e.g., a convolutional neural network, recurrent neural network, or other neural network), decision tree, support vector machine, Bayesian network, genetic algorithm, deep learning system separate from a neural network, or other machine learning model. In some cases, the machine learning model may be of an unconventional structure or otherwise demonstrate unconventional functionality. For example, in some implementations, the machine learning model can be a pairwise convolutional neural network model that takes multiple (e.g., two) inputs, such as for pairwise comparison of input video data.

The implementations of this disclosure are described with respect to the processing of video chunks. That is, because the rate-distortion characteristics of videos can potentially vary significantly over time, it may be particularly desirable to divide a given video into chunks and separately process the rate-distortion curves for each chunk. Accordingly, the implementations of this disclosure describe transcoding processing which occurs at the video chunk-level, in which the optimal bitrate for a given video chunk is identified such that an aggregate measure of distortion is minimized subject to one or more transcoder constraints (e.g., an average bitrate).

However, other implementations of this disclosure are possible which would instead apply to other video levels. For example, in some implementations, the rate-distortion predictor and rate-distortion optimizer as described herein may be used to process video data at the frame-level. In such an implementation, the rate-distortion predictor would take a video frame as input instead of a video chunk, and the rate-distortion optimizer would process the output of the rate-distortion predictor against a distribution based on video frames rather than video chunks. In another example, in some implementations, the rate-distortion predictor and rate-distortion optimizer as described herein may be used to process video data at the block-level. In such an implementation, the rate-distortion predictor would take a video block as input instead of a video chunk and would determine complexity features of the video block using spatial and/or temporal feature maps. The rate-distortion optimizer would then process the output of the rate-distortion prediction against a distribution based on video blocks rather than video chunks. Furthermore, still other implementations of this disclosure are possible which perform the prediction and optimization described herein for transcoding image data instead of video data. For example, such implementations as are described above for processing video data at the frame-level may in some cases be used for transcoding images in place of video frames. Other implementations of video and image transcoding are also possible in accordance with this disclosure.

Further details of techniques for multivariate rate control for transcoding video content are described herein with initial reference to a system in which such techniques can be implemented. FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
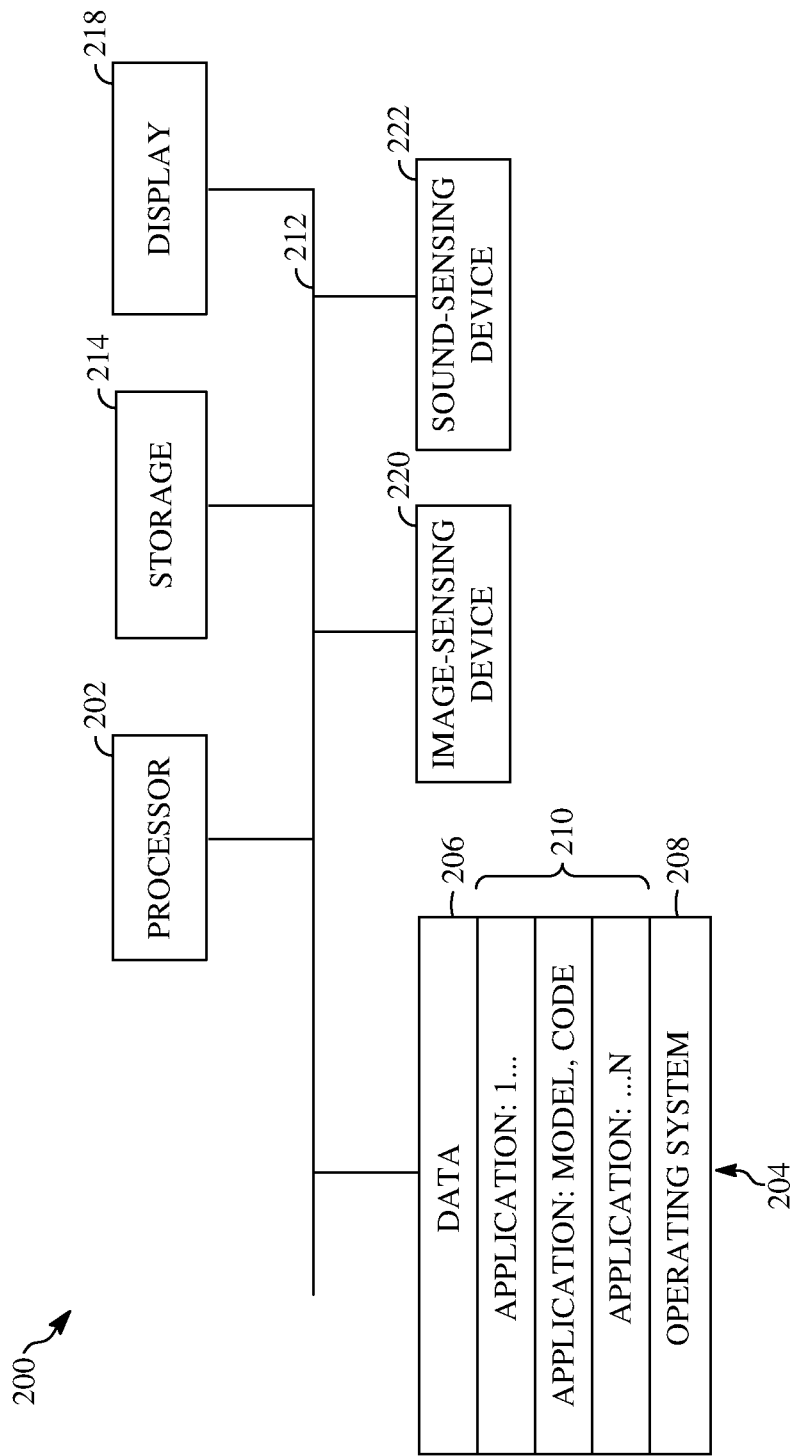
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol-based (HTTP-based) video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data.

Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a learning model training application and/or a video stream transcoding application that performs the techniques described herein.

The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
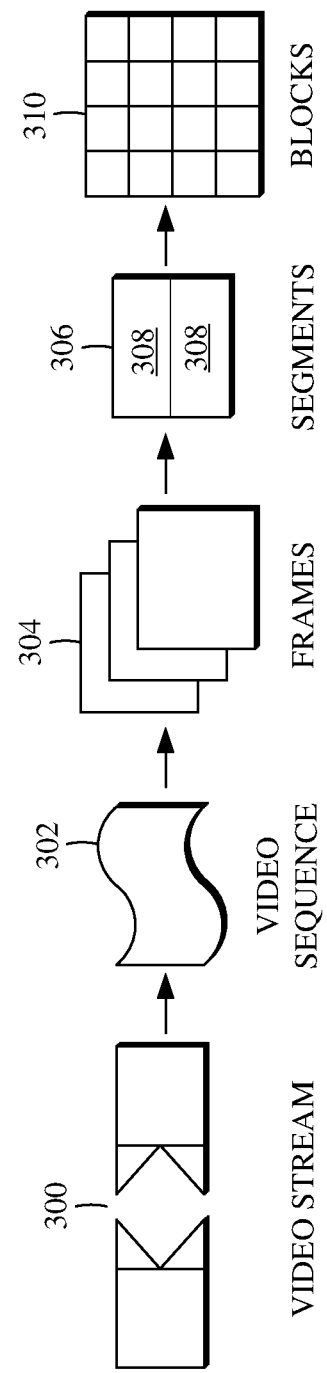
FIG. 3 is a diagram of an example of a video stream to be encoded and decoded.

FIG. 3 is a diagram of an example of a video stream 300 to be encoded and decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, N×M pixels in the frame 306, in which N and M may refer to the same integer value or to different integer values. The blocks 310 can also be arranged to include data from one or more segments 308 of pixel data. The blocks 310 can be of any suitable size, such as 4×4 pixels, 8×8 pixels, 16×8 pixels, 8×16 pixels, 16×16 pixels, or larger up to a maximum block size, which may be 128×128 pixels or another N×M pixels size.

Figure 4:
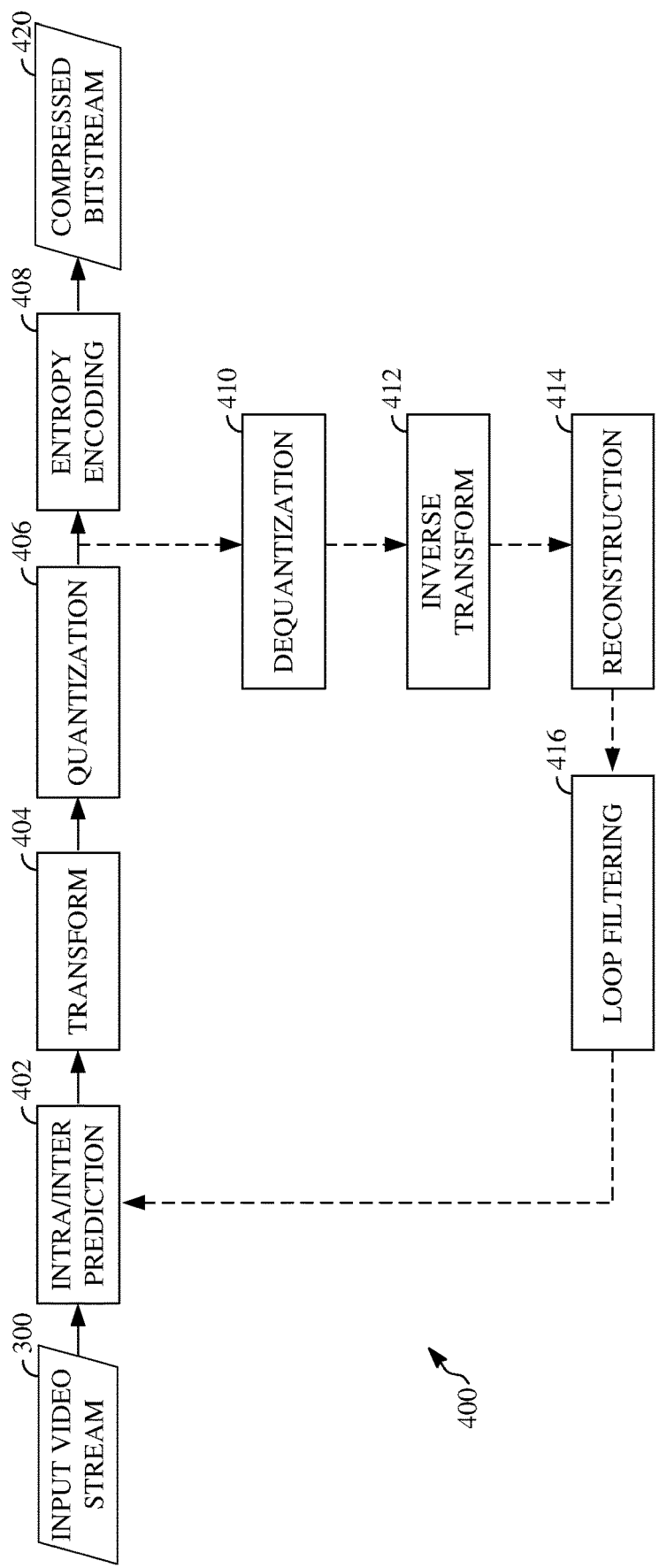
FIG. 4 is a block diagram of an example of an encoder.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In some implementations, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

In some cases, the functions performed by the encoder 400 may occur after a filtering of the video stream 300. That is, the video stream 300 may undergo pre-processing according to one or more implementations of this disclosure prior to the encoder 400 receiving the video stream 300. Alternatively, the encoder 400 may itself perform such pre-processing against the video stream 300 prior to proceeding to perform the functions described with respect to FIG. 4, such as prior to the processing of the video stream 300 at the intra/inter prediction stage 402.

When the video stream 300 is presented for encoding after the pre-processing is performed, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual).

At the reconstruction stage 414, the prediction block that was predicted at the intra/inter prediction stage 402 can be added to the derivative residual to create a reconstructed block. The loop filtering stage 416 can apply an in-loop filter or other filter to the reconstructed block to reduce distortion such as blocking artifacts. Examples of filters which may be applied at the loop filtering stage 416 include, without limitation, a deblocking filter, a directional enhancement filter, and a loop restoration filter.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
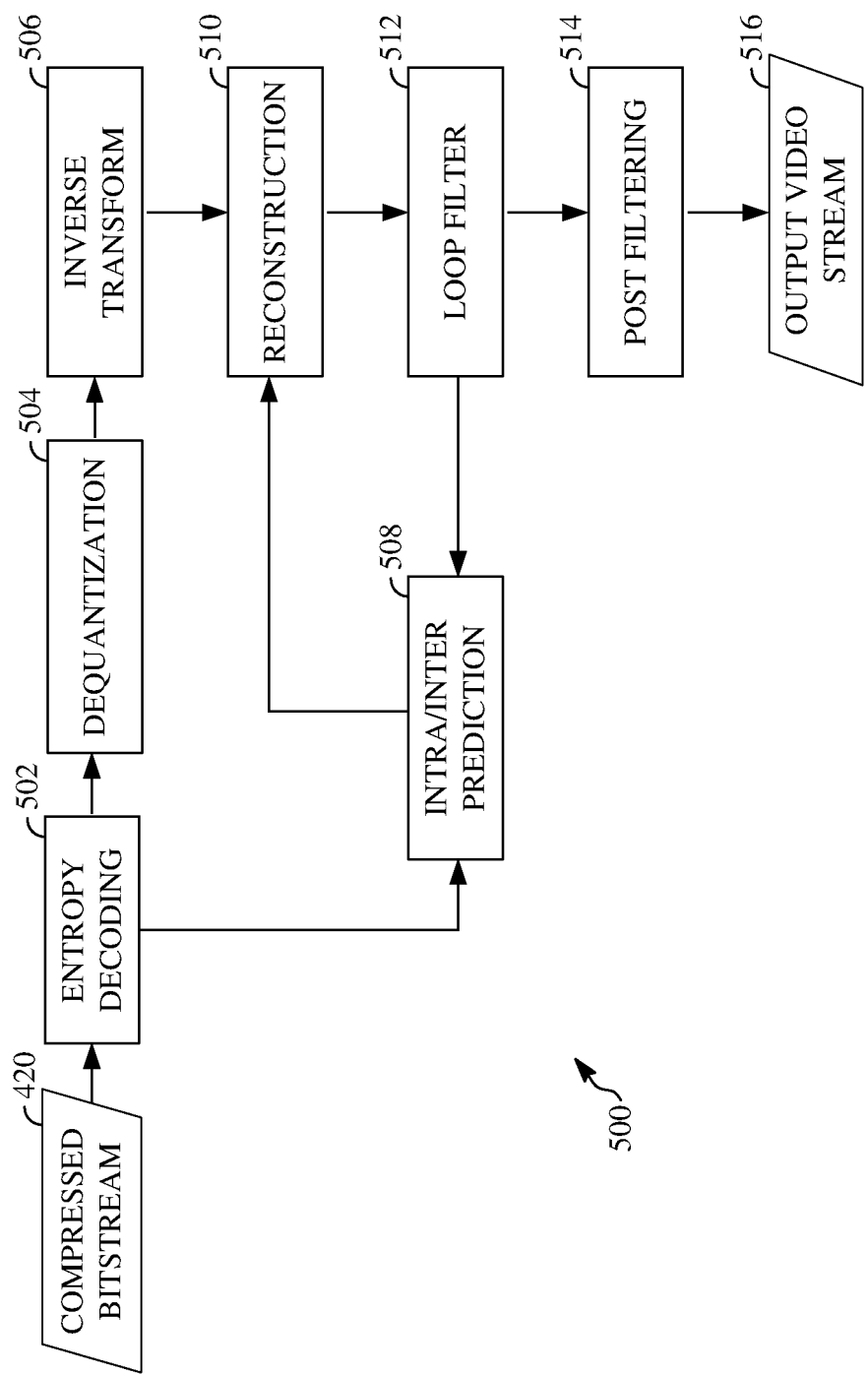
FIG. 5 is a block diagram of an example of a decoder.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106. In some implementations, the decoder 500 is a hardware decoder.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a post filter stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Examples of filters which may be applied at the loop filtering stage 512 include, without limitation, a deblocking filter, a directional enhancement filter, and a loop restoration filter. Other filtering can be applied to the reconstructed block. In this example, the post filter stage 514 is applied to the reconstructed block to reduce blocking distortion, and the result is output as the output video stream 516. The output video stream 516 can also be referred to as a decoded video stream, and the terms will be used interchangeably herein.

Other variations of the decoder 500 can be used to decode the compressed bitstream 420. In some implementations, the decoder 500 can produce the output video stream 516 without the post filter stage 514 or otherwise omit the post filter stage 514.

Figure 6:
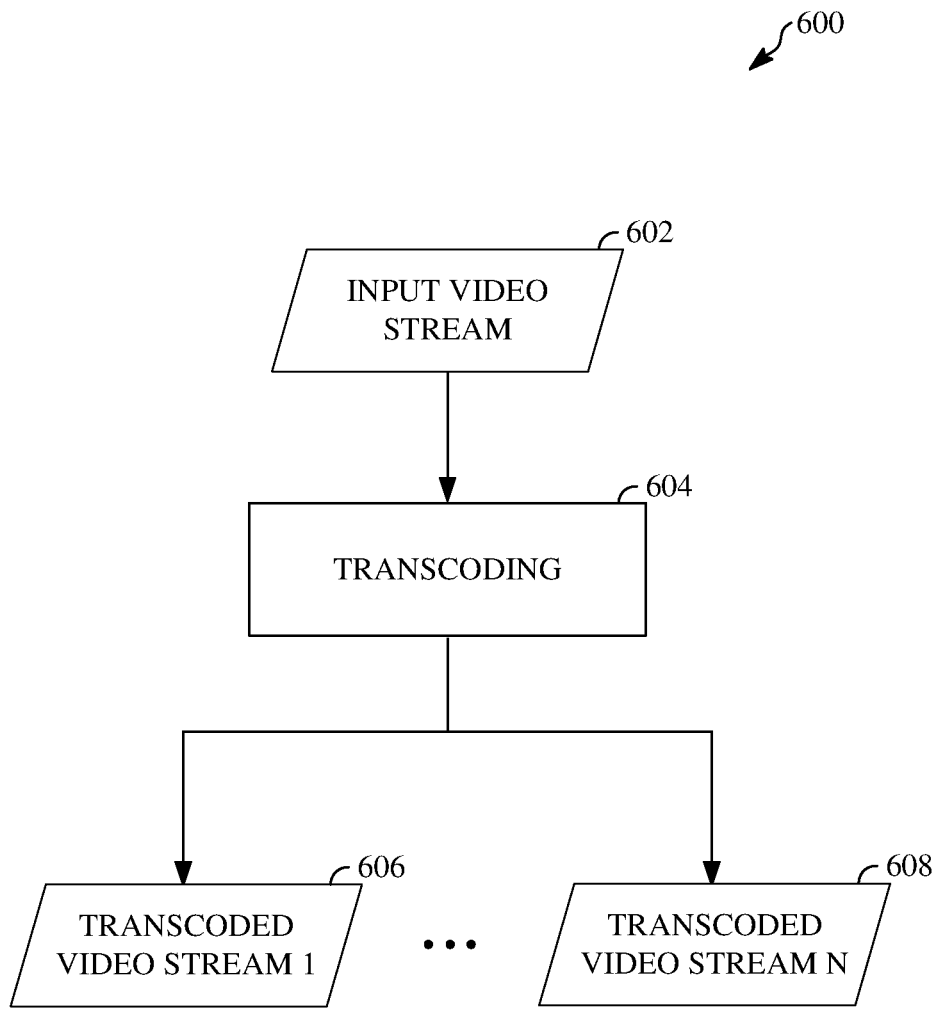
FIG. 6 is a block diagram of an example of a transcoder.

FIG. 6 is a block diagram of an example of a transcoder 600. The transcoder 600 can be implemented in the transmitting station 102, such as by providing a computer software program stored in memory, for example, the memory 204. The computer software program can include machine instructions that, when executed by a processor such as the processor 202, cause the transmitting station 102 to transcode video data in the manner described in FIG. 6. The transcoder 600 can also be implemented as specialized hardware included in, for example, the transmitting station 102. In some implementations, the transcoder 600 can be or represent functionality performed in connection with an encoder, such as the encoder 400 shown in FIG. 4. In some implementations, the encoder 400 and the transcoder 600 can be combined into a single computer software program.

The transcoder 600 represents a transcoding pipeline that receives an input video stream 602 and transcodes the input video stream 602 to produce transcoded content. The input video stream 602 is a video stream of video content uploaded to a video hosting platform, either for storage and later playback, live streaming, or both. The input video stream 602 may, for example, be the video stream 300 shown in FIG. 4. The video content of the input video stream 602 may be user generated video content or other video content. A transcoding stage 604 uses searched parameters to transcode the input video stream 602, such as to produce transcoded video streams at different target bitrates and quality levels. In the example shown, the transcoding stage 604 produces a transcoded video stream 1 606 at a first resolution based on the input video stream 602 through a transcoded video stream N 608 at a second resolution based on the input video stream 602.

The transcoding stage 604 conducts a search across the transcoding space to determine the parameters for transcoding the input video stream 602, such as based on different quality control metric tools, different resolutions, and the content of the input video stream 602. The transcoded video stream 1 606 through the transcoded video stream N 608 represent possible transcoded versions for the input video stream 602 using different parameters determined by the searching across the transcoding space. Each of the transcoded video stream 1 606 through the transcoded video stream N 608 may be or otherwise represent an output bitstream, which may, for example, be the compressed bitstream 420 shown in FIGS. 4 and 5. The output bitstream may be output or stored for further processing, for example, using a decoder, such as the decoder 500 shown in FIG. 5.

Figure 9:
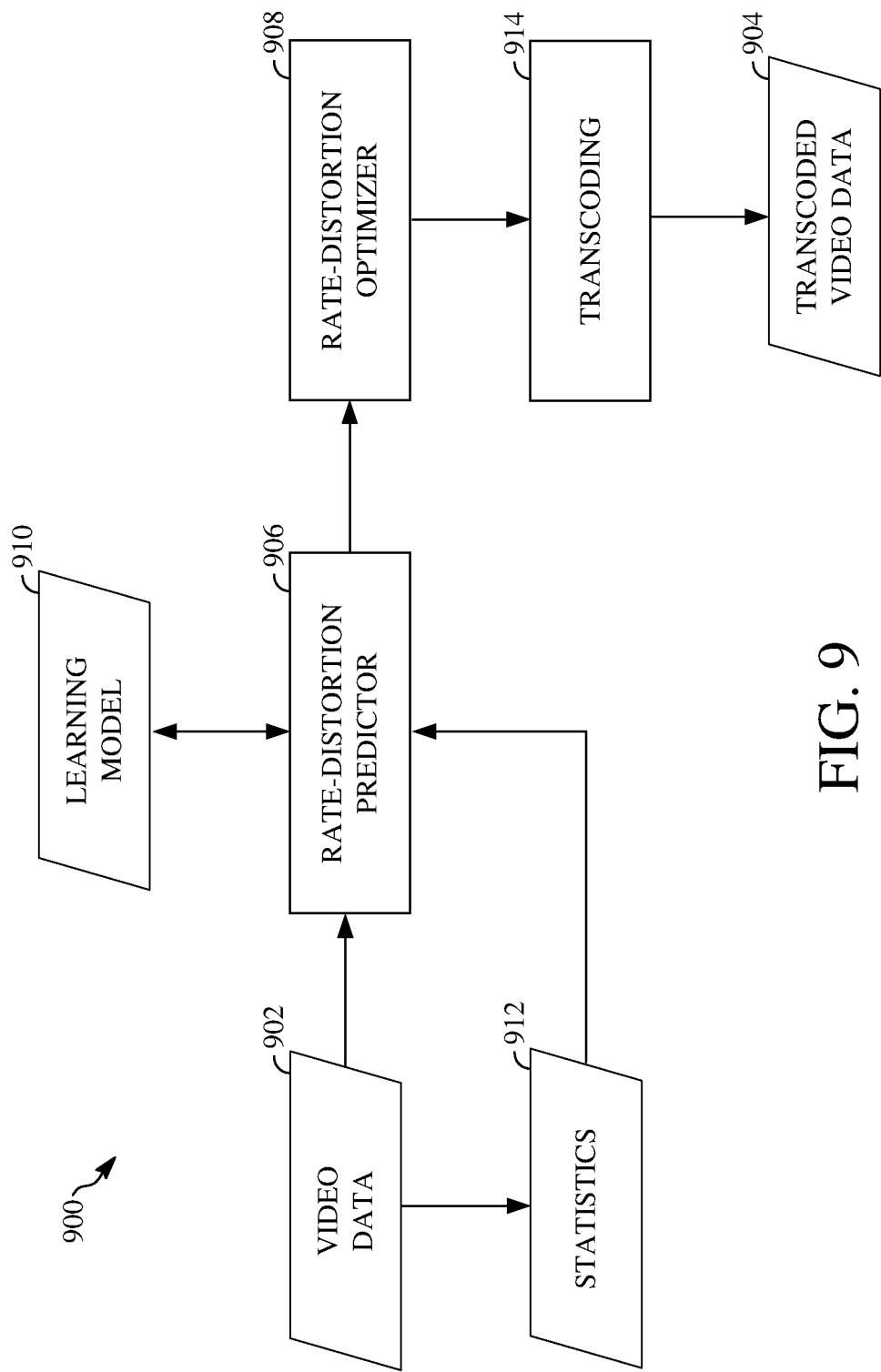
FIG. 9 is a block diagram of a transcoder used for multivariate rate control for transcoding video content.

FIG. 9 is a block diagram of a transcoder 900 used for multivariate rate control for transcoding video content. The transcoder 900 may, for example, represent improvements to the transcoder 600 shown in FIG. 6, such as based on the multivariate rate control techniques for transcoding video content as described by the implementations of this disclosure. Thus, the transcoder 900 describes transcoding functionality in which transcoding parameters are selected using multivariate rate control techniques rather than by conducting a search across the transcoding space.

The transcoder 900 represents functionality implemented in connection with an encoder, for example, the encoder 400 shown in FIG. 4. The transcoder 900 receives video data 902 as input and produces transcoded video data 904 as input. The video data 902 may, for example, be the input video stream 602 shown in FIG. 6 or a portion of the input video stream 602. For example, the video data 902 may be one or more video chunks of the input video stream 602. In another example, the video data 902 may be one or more video frames of the input video stream 602 expressed other than in a video chunk format. The transcoded video data 904 may, for example, be one of the transcoded video stream 1 606 shown in FIG. 6 or the transcoded video stream N 608 shown in FIG. 6.

The transcoder 900 includes a rate-distortion predictor stage 906 and a rate-distortion optimizer stage 908. The rate-distortion predictor stage 906 uses a learning model 910 to predict the rate-distortion behavior of the video data 902 based on statistics 912 for the video data 902. The rate-distortion optimizer stage 908 optimizes a transcoding of the video data 902 by selecting transcoding parameters available for transcoding the video data 902 based on the predictions determined at the rate-distortion predictor stage 906. The video data 902 is then transcoded using the selected transcoding parameters at a transcoding stage 914 to produce the transcoded video data 904.

The statistics 912 include or refer to encoding-related information, such as complexity features, determined based on the video data 902. The rate-distortion predictor stage 906 can derive the statistics 912 from information included within a pass log received from an encoder used for encoding the video data 902. For example, the rate-distortion predictor stage 906 may use a pass log parser to identify the statistics 912 from within the pass log during the encoding of the video data 902. In implementations in which the transcoder 900 is integrated into the encoder itself, the statistics 912 may be passed directly to the rate-distortion predictor stage 906 from a function of the encoder which collects or generates the statistics 912.

Alternatively, the statistics 912 can be determined using one or more feature maps generated based on the video data 902. A feature map as may be used to determine the statistics 912 is generated for predicting spatial or temporal features of the video data 902. In some cases where a feature map is generated for predicting spatial features of the video data 902, the feature map is a two-dimensional map of spatial features, which may be generated using a Gabor filter. However, in some cases, the spatial features of the video data 902 may be determined other than by using a Gabor filter. In some cases where a feature map is generated for predicting temporal features of the video data, the feature map is a two-dimensional optimal flow of temporal features generated between two video frames of the video data 902. However, in some cases, the temporal features of the video data 902 may be determined other than by using an optical flow. The determining of the statistics 912 may be limited to using one or more feature maps where the transcoding performed by the transcoder 900 is at a block-level, such as due to limitations of an encoder to produce a pass log for only a portion of a video frame.

As a further alternative, the statistics 912 can be determined using other pre-processing performed for intra-frames or inter-frames of the video data 902. For example, pre-processed information about the video data 902 may be used to generate segment-level data, such as lock which may be used for media analysis in the transcoder 900. Other approaches for determining the statistics 912 are also possible.

Where a pass log is used to determine the statistics, the pass log can, in at least some cases, include information usable to optimize the transcoding of the video data 902 at multiple resolutions. For example, where the video data 902 is encoded such that a pass log is produced at 1080p, information included within the pass log, such as information relating to complexity features of the video data 902, may be used to represent the video data 902 also in 720p, 480p, and possibly other resolutions. In this way, a single pass log can, in at least some cases, be used to provide the statistics 912 for transcoding the video data 902 into multiple resolutions.

The transcoder 900 may be integrated within a two-pass encoding scheme in which, during a first pass, the encoder collects or generates the statistics 912 for the video data 902 and, during a second pass, the encoder uses the statistics 912 for encoding the video data 902. Alternatively, the transcoder 900 may instead be integrated within a one-pass encoding scheme in which the statistics 912 are collected or generated from the encoding of the video data 902 and used for the transcoding of the video data 902.

The rate-distortion predictor stage 906 predicts the rate-distortion behavior of the video data 902 using the learning model 910. The predictions output by the rate-distortion predictor stage 906 for the video data 902 indicate a rate-distortion cluster to which the video data 902 corresponds, which rate-distortion cluster is used for modeling the rate control of the video data 902 for transcoding. The rate-distortion cluster is determined by the rate-distortion predictor stage 906 querying the learning model 910 according to the video data 902. Implementations and examples of a rate-distortion predictor stage according to the implementations of this disclosure are further described below with respect to FIG. 10.

The rate-distortion optimizer stage 908 determines a globally optimal bit allocation for the video data 902 based on an identification of an optimal operating point for the video data 902 relative to the corpus of the video hosting platform. In particular, the rate-distortion optimizer stage 908 determines globally optimal transcoding parameters for the video data 902 by minimizing, over the corpus of the video hosting platform, a total or average bitrate to use for the transcoding subject to quality constraints defined for the transcoding. The globally optimal transcoding parameters determined for the video data 902 are determined specific to the video data 902 may not be the same globally optimal transcoding parameters determined for other sets of video data. The rate-distortion optimizer stage 908 determines the globally optimal transcoding parameters for the video data 902 by using the rate-distortion cluster prediction output from the rate-distortion predictor stage 906 to select transcoding parameters for transcoding the video data 902. As a result, the rate-distortion optimizer stage 908 minimizes the total corpus egress and/or storage, such as by maintaining or improving the corpus average quality. Implementations and examples of a rate-distortion optimizer stage according to the implementations of this disclosure are further described below with respect to FIG. 11.

Figure 10:
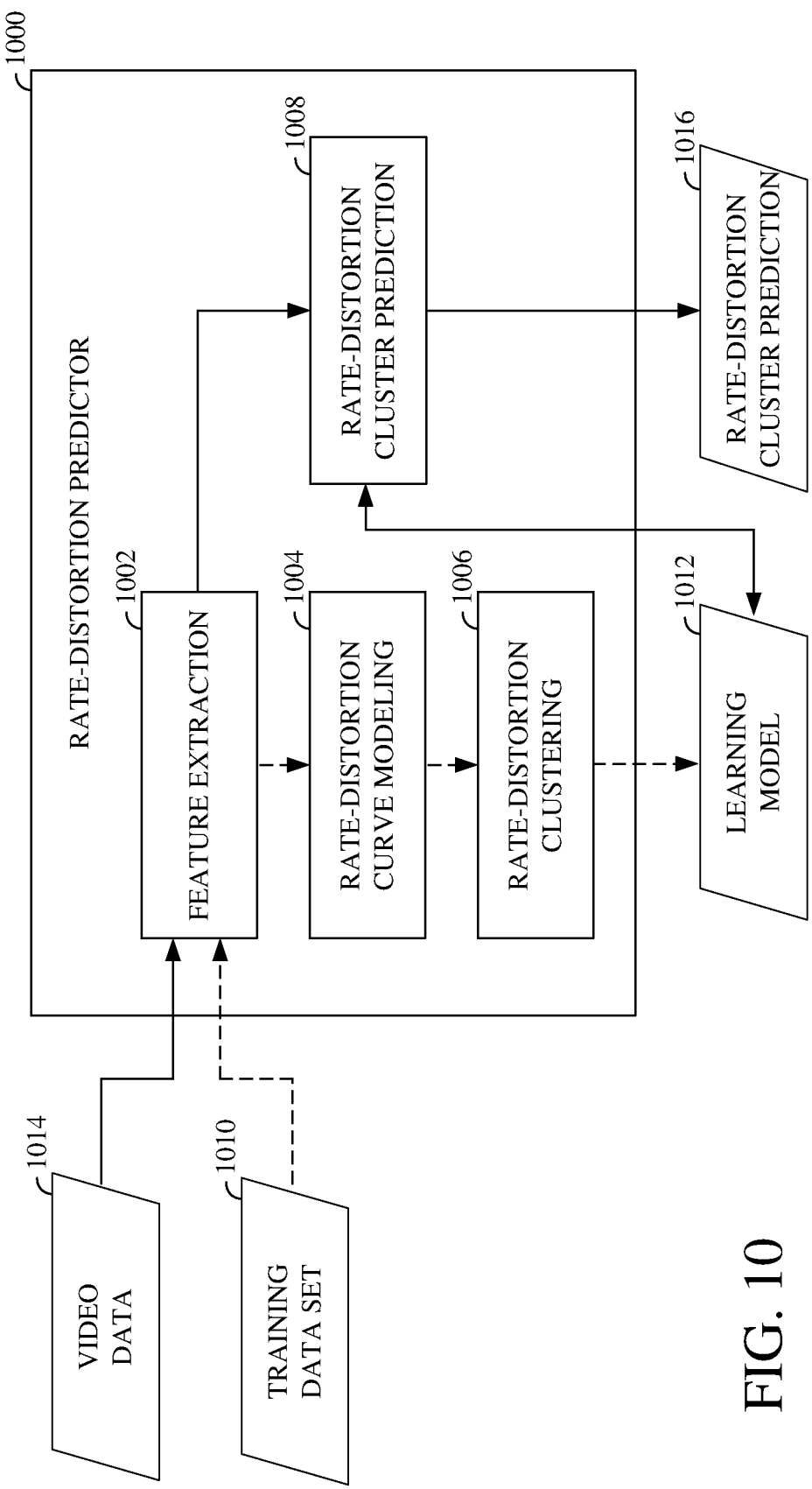
FIG. 10 is a block diagram of a rate-distortion predictor of a transcoder used for multivariate rate control for transcoding video content.

FIG. 10 is a block diagram of a rate-distortion predictor stage 1000 of a transcoder used for multivariate rate control for transcoding video content. The rate-distortion predictor stage 1000 may, for example, be the rate-distortion predictor stage 906 shown in FIG. 9. The rate-distortion predictor stage 1000 includes a feature extraction stage 1002, a rate-distortion curve modeling stage 1004, a rate-distortion clustering stage 1006, and a rate-distortion cluster prediction stage 1008. The rate-distortion predictor stage 1000 uses different pathways for training and inference of video data.

According to a first pathway used for training, shown in FIG. 10 by dashed lines, the rate-distortion predictor stage 1000 receives a training data set 1010 as input and processes the training data set 1010 at the feature extraction stage 1002, the rate-distortion curve modeling stage 1004, and the rate-distortion clustering stage 1006 to produce a learning model 1012 trained based on the training data set 1010. The learning model 1012 may, for example, be the learning model 910 shown in FIG. 9. In this way, the rate-distortion predictor stage 1000 may thus be used to train the learning model 1012 to predict rate-distortion behavior for video data based on a corpus of a video hosting platform According to a second pathway used for inference, such as for transcoding video data, the rate-distortion predictor stage 1000 receives video data 1014 as input and processes the video data 1014 at the feature extraction stage 1002 and the rate-distortion cluster prediction stage 1008, which uses the trained learning model 1012, to produce a rate-distortion cluster prediction 1016 as output. The video data 1014 may, for example, be the video data 902 shown in FIG. 9. In this way, the rate-distortion predictor stage 1000 may thus be used to transcode video data uploaded to the video hosting platform by predicting the rate-distortion behavior of that video data using a learning model trained based on a corpus of the video hosting platform.

The training data set 1010 includes statistics and rate-distortion data for video data of the corpus of the video hosting platform, which are identified by the processing of the training data set 1010 at the feature extraction stage 1002. The statistics represent complexity features in the video data and are collected from or generated by an encoder and may, for example, be of the same kind as the statistics 912 shown in FIG. 9. For example, the statistics for a given video of the training data set 1010 may be received within a pass log of the encoder or determined using feature maps generated for the given video. The statistics correspond to different sets of video data of the corpus of the video hosting platform in which the sets of video data include video content which may be classified into different video content categories (e.g., gameplay streaming video, news program videos, musical lyric videos, etc.). In some implementations in which the statistics are derived from a pass log, the feature extraction stage 1002 uses a pass log parser to parse, such as by decoding, pass log information from an encoder (e.g., the encoder 400 shown in FIG. 4) to determine the complexity features.

The rate-distortion data represents rate-distortion curves used to code the video data in which each of the rate-distortion curves has at least one point along it. Specifically, the rate-distortion curves are produced by transcoding the video data using different sets of transcoding parameters and charting the change in bitrate and distortion tradeoff for the video data as results from the different sets of transcoding parameters. The training data set 1010 is collected from a test set generated by fair, random sampling of the corpus of the video hosting platform and includes video data from some or all complexity classes. The video data included in the training data set 1010 is encoded at different quality levels to generate the features and labels for training the learning model 1012.

The rate-distortion curve modeling stage 1004 models rate-distortion curves for the training data set 1010 based on the features identified at the feature extraction stage 1002. For each of the rate-distortion curves, a number of rate features are extracted for unsupervised learning. The rate features include, but are not necessary limited to: the bitrate at which the minimum quality control metric value is achieved, referred to as $r_0$; the bitrate at which the maximum quality control metric value is achieved, referred to as $r_{n-1}$; and multiple operating points in between $r_0$ and referred to $r_1$ to $r_{n-2}$, including the point of diminishing returns, referred to as $r_d$. In some cases, the modeling of rate-distortion curves at the rate-distortion curve modeling stage 1004 may be guided by definitions of maximum values for the one or more quality control metrics (e.g., PSNR, PSNR mean opinion score (PSNR MOS), video multimethod assessment fusion (VMAF), structural similarity index (SSIM), and/or another quality control metric), such as to prevent or reduce noise which could otherwise interfere with the unsupervised learning.

The operating points $r_1$ to $r_{n-2}$ are selected so as to capture the basic shape of the rate-distortion curve. Each operating point along a given rate-distortion curve may correspond to a quantization parameter used by an encoder used for encoding the video data, such that the operating points along a given rate-distortion curve refer to different quantization step sizes for assessing bitrate and quality. Encoding the video data at a given operating point thus results in a representation with a given bitrate a distortion value denoted along the rate-distortion curve. The spacing between the operating points $r_1$ to $r_{n-2}$ may be selected based on an objective measured score change. The objective measured score change refers to a noticeable quality transition and may be subjective to the quality control metric used. For example, where VMAF is used, the objective measured score change may indicate that a noticeable quality transition occurs at each six points along a rate-distortion curve, in which each of those six points corresponds to a different quantization parameter.

The rate-distortion clustering stage 1006 clusters the rate-distortion curves modeled at the rate-distortion curve modeling stage 1004 using features extracted from those rate-distortion curves. The clustering may, for example, be performed using a k-means algorithm, a hierarchical clustering algorithm, or another algorithm. In particular, for each rate-distortion curve, a vector of rate-distortion sample values along the curve are clustered into a number of clusters using, for example, k-means, in which a distance between normalized operating points defines a cost function for the clustering. The number of clusters may be determined empirically, such as based on the variation in rate-distortion characteristics in the corpus of the video hosting platform.

The centroid curve of a given cluster is used to get rate-distortion curves for mapping an operating point along a given rate-distortion curve to bitrate and distortion values corresponding to the operating point. The centroid curves of the clusters represent good approximations for bitrate and distortion for given video data in the corresponding cluster. The clustering also reduces noise resulting from the modeling and may further limit the overall prediction loss for the rate-distortion curves. The rate-distortion clustering stage 1006 thus uses machine learning to model rate-distortion curves of video data of the training data set 1010 by performing unsupervised learning for the clustering of the rate-distortion curves.

The learning model 1012 is trained to improve the accuracy of rate-distortion cluster prediction based on the clustering at the rate-distortion clustering stage 1006. In particular, the learning model 1012 models the rate-distortion behavior of the videos based on the clustering of videos based on similar rate-distortion characteristics. The learning model 1012 thus enables the classification of a large sample of the corpus of the video hosting platform to estimate the distribution of the number of videos in each of the rate-distortion clusters. For example, the estimated distribution may be used to determine an optimal encoder operating point for each of the rate-distortion clusters.

The learning model 1012 is thus trained to predict the rate-distortion cluster of the video data 1014 using complexity features of the video data 1014. During inference, the learning model 1012 is used to model the rate-distortion behavior of videos of the corpus of the video hosting platform. The video data 1014 is processed at the feature extraction stage 1002 to identify complexity features of the video data 1014. The complexity features are then processed at the rate-distortion cluster prediction stage 1008 to determine the rate-distortion cluster prediction 1016 for the video data 1014. The rate-distortion cluster prediction 1016 indicates the rate-distortion cluster which is predicted to correspond to the video data 1014.

In particular, the rate-distortion cluster prediction stage 1008 uses the complexity features of the video data 1014 to query the learning model 1012 for a rate-distortion cluster to which the complexity features correspond. The rate-distortion cluster is one of multiple rate-distortion clusters produced at the rate-distortion clustering stage 1006 and which were used to train the learning model 1012. The rate-distortion cluster prediction stage 1008 thus uses the learning model 1012 to determine whether videos have similar rate-distortion characteristics based on complexity features of the videos, which complexity features take the actual content of the videos into consideration.

The classifications performed at the rate-distortion predictor stage 1000 reduce the complexity in the optimization of the rate-distortion curve determination for video data, such as based on differences in video content for video data of different categories of video. Furthermore, rather than having to encode each video multiple times to directly compute a rate-distortion model for each video, the learning model 1012 can be used to process a set of complexity features to identify the rate-distortion cluster to which a given video belongs. The rate-distortion cluster prediction for the given video can then be determined based on the identified rate-distortion cluster.

In some implementations, rather than using a single learning model for all of the rate-distortion curves, each cluster of rate-distortion curves may be modeled separately using a different learning model (e.g., a deep learning neural network). This may, for example, have the added benefit of further improving the prediction accuracy for the rate-distortion cluster prediction 1016, albeit with the tradeoff being a potential increase in computing resources.

In some implementations, the rate-distortion curves determined for the training data set 1010 can be approximated to the rate-distortion features of the centroids of a rate-distortion curve cluster. In some implementations, instead of assigning a single label for the video data, a set of labels can be assigned in which the labels indicate the probability that given video data is included in a particular one of the clusters. In such an implementation, a given rate feature for the video data can be determined using an algorithm which computes the probability that given video data is included in a particular one of the rate-distortion clusters based on the features of those clusters.

In some implementations, the rate-distortion predictor stage 1000 may use a complexity feature-based approach for modeling rate-distortion curves instead of the cluster-based approach described above. With the complexity feature-based approach, rather than clustering rate-distortion curves for video content and modeling rate-distortion behavior based on those clusters, rate-distortion curves are separately computed and modeled for all samples across the corpus of the video hosting platform. In such a case, the rate-distortion curves are computed and modeled for given video using complexity features of that given video, which may be derived from an encoder pass log or feature maps generated for the given video. The learning model 1012 is thus trained to predict transcoding parameters for a video based on the complexity features of the corpus of the video hosting platform.

The complexity feature-based approach may ultimately provide a more accurate solution to rate-distortion cluster prediction, with the major tradeoff being increased computational expense and complexity, such as is imposed by the large number of rate-distortion curves which are computed and modeled. With the complexity feature-based approach, there is also a potential misrepresentation of content of the video hosting platform corpus, such as based on the size and content distribution of the corpus. There is also the potential for the complexity feature-based approach to be more sensitive to noisy data than the cluster-based approach, such as results from the combination of modeled predictions across the wide content space of the video hosting platform corpus.

Figure 11:
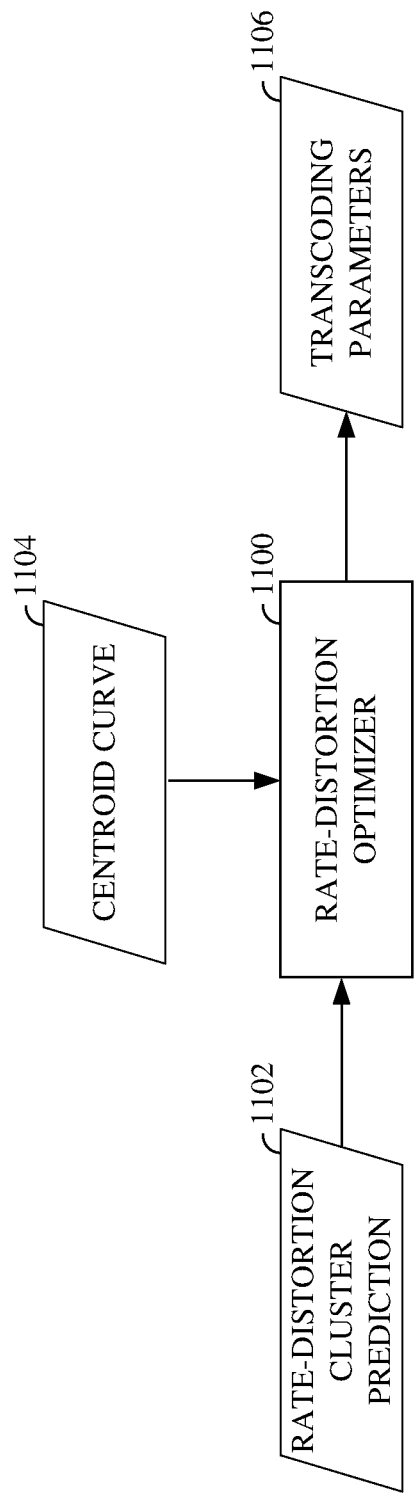
FIG. 11 is a block diagram of a rate-distortion optimizer of a transcoder used for multivariate rate control for transcoding video content.

FIG. 11 is a block diagram of a rate-distortion optimizer stage 1100 of a transcoder used for multivariate rate control for transcoding video content. The rate-distortion optimizer stage 1100 may, for example, be the rate-distortion optimizer stage 908 shown in FIG. 9. The rate-distortion optimizer stage 1100 receives a rate-distortion cluster prediction 1102 and a centroid curve 1104 as input and selects transcoding parameters 1106 as output. The rate-distortion cluster prediction 1102 may, for example, be the rate-distortion cluster prediction output from the rate-distortion predictor stage 1000 shown in FIG. 10. The centroid curve 1104 is the centroid curve of the rate-distortion cluster corresponding to the rate-distortion cluster prediction 1102. The transcoding parameters 1106 are selected for transcoding video data, such as to produce the transcoded video data 904 shown in FIG. 9.

The rate-distortion optimizer stage 1100 operates to select transcoding parameters use the rate-distortion cluster prediction 1102 and the centroid curve 1104 to minimize the total or average bitrate for video data of the corpus of a video hosting platform subject to quality constraints defining limits on the total and maximum distortion values corresponding to bitrate values. In one non-limiting example, the quality constraints may be used to minimize a sum of bitrate values for coding the video data at the operating point along the centroid curve and subject to a condition that the total distortion corresponding to the bitrate value sum at the operating point is less than or equal to the average distortion across the corpus of the video hosting platform before optimization. In particular, a large sample of the corpus of the video hosting platform is classified into different clusters using the learning model trained for the clustering (e.g., the learning model 1012 shown in FIG. 10), and the distribution between those clusters can then be used to compute average bitrate and distortion values for the corpus for a set of given operating points for the clusters, such as based on the centroid curves of those clusters.

In a further non-limiting example, the rate-distortion optimizer stage 1100 may minimize the bitrate for the video data subject to quality constraints including a further condition that the total distortion corresponding to the bitrate value sum at the operating point is less than or equal to a maximum threshold for acceptable distortion across the corpus of the video hosting platform. This further condition serves to minimize the maximum distortion tolerance for the rate-distortion optimization. Alternatively, as described above, the rate-distortion optimizer stage 1100 can be specifically configured to minimize the total corpus egress and/or storage.

When configured for storage optimization, the rate-distortion optimizer stage 1100 solves a problem of minimizing the bitrate for transcoding the video data subject to quality constraints based on a sum of bitrate values for coding the video data and subject to a first condition stating that the total distortion for coding the video data with a given bitrate must be less than or equal to the average distortion across the corpus of the video hosting platform before optimization is performed and to a second condition stating that the maximum distortion for coding the video data with that given bitrate must be less than the maximum distortion allowed across the corpus of the video hosting platform.

When configured for egress optimization, the rate-distortion optimizer stage 1100 solves a problem of minimizing the bitrate for transcoding the video data subject to quality constraints based on a sum of bitrate values for coding the video data weighted by watch times and subject to a first condition stating that the total distortion for coding the video data with a given bitrate and weighted by the watch times must be less than or equal to the average distortion across the corpus of the video hosting platform before optimization is performed and to a second condition stating that the maximum distortion for coding the video data with that given bitrate and weighted by the watch times must be less than the maximum distortion allowed across the corpus of the video hosting platform.

In a further non-limiting example, rather than seeking to minimize the bitrate for the video data subject to quality constraints, the rate-distortion optimizer stage 1100 may use a constant bitrate or capped variable bitrate to maintain total bandwidth requirements for video delivery and maximize the delivered quality of video data while keeping the egress and/or the storage of the corpus of the video hosting platform the same as before optimization. For example, the rate-distortion optimizer stage 1100 may operate to select an operating point along a centroid curve at which the bitrate remains constant or capped but the quality is maximized.

In some implementations, the rate-distortion optimizer stage 1100 uses a verification tool to verify that the transcoding of the video data into the transcoded video data (e.g., the video data 902 and the transcoded video data 904 shown in FIG. 9) is in accordance with one or more transcoder constraints, for example, maximum bitrate, level constraints, or the like. For example, the verification tool may process the video data after it is transcoded such as by comparing transcoding parameters used against those transcoder constraints. In another example, the verification tool may process the video data before it is transcoded or in parallel with the production thereof such as by comparing the transcoding parameters to be used or being used, as applicable, against those transcoder constraints. In some such implementations, responsive to a determination that one or more of the transcoder constraints is violated by the transcoding of the video data, the transcoding may be repeated using different transcoding parameters.

Figure 12:
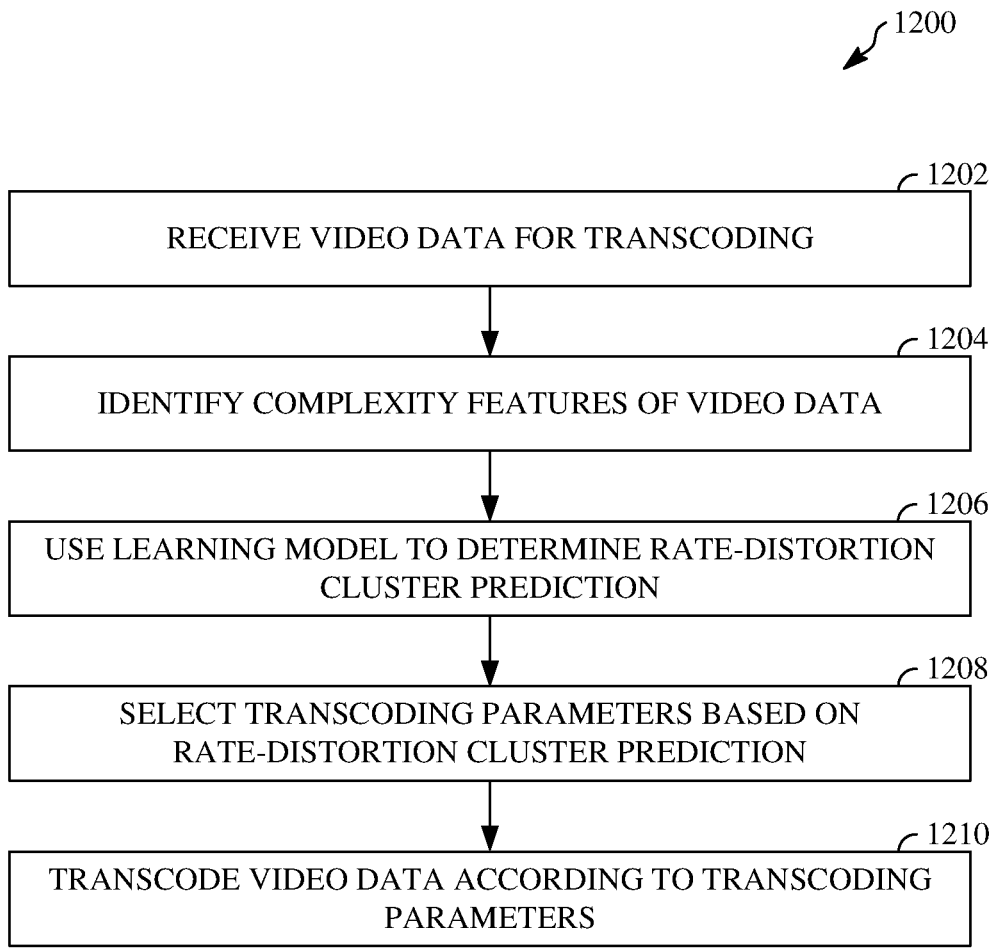
FIG. 12 is a flowchart diagram of an example of a technique for multivariate rate control for transcoding video content using a learning model trained for a global corpus of a video hosting platform.
Figure 13:
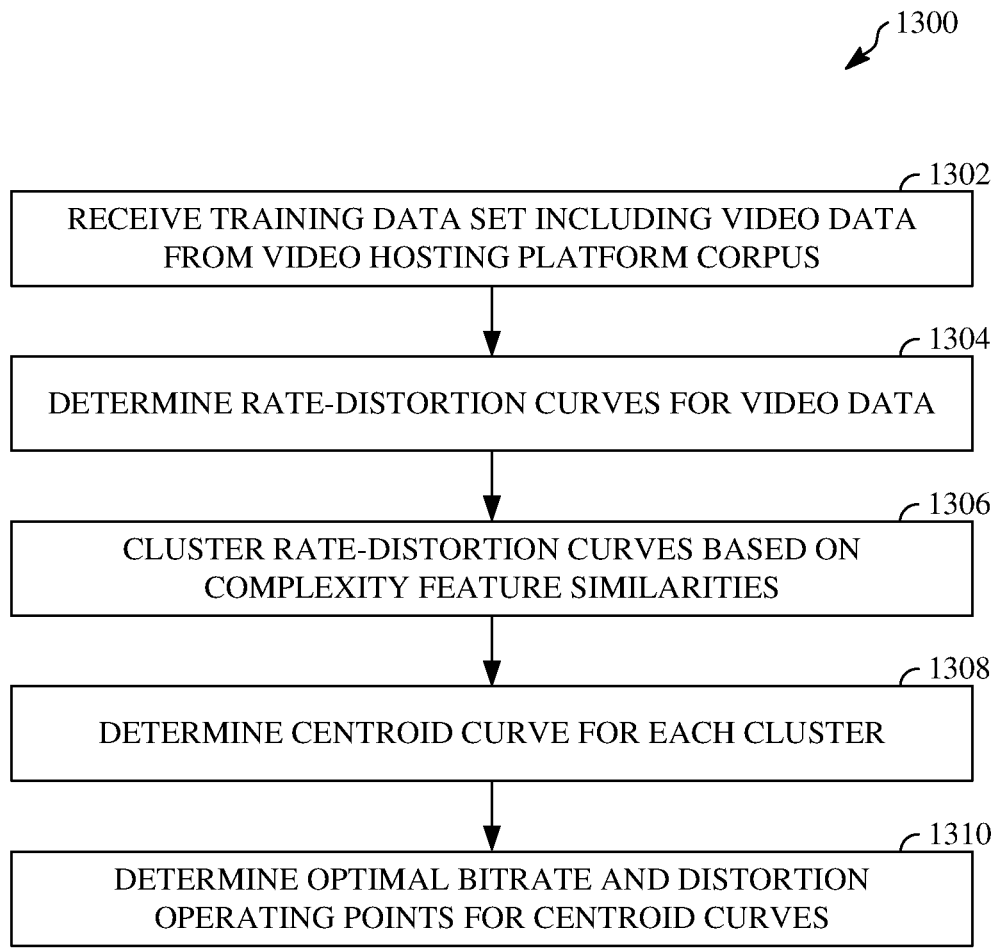
FIG. 13 is a flowchart diagram of an example of a technique for training a learning model for multivariate rate control for transcoding video content using a global corpus of a video hosting platform.

Further details of techniques for multivariate rate control for transcoding video content are now described. FIG. 12 is a flowchart diagram of an example of a technique 1200 for multivariate rate control for transcoding video content using a learning model trained for a global corpus of a video hosting platform. FIG. 13 is a flowchart diagram of an example of a technique 1300 for training a learning model for multivariate rate control for transcoding video content using a global corpus of a video hosting platform.

The technique 1200 and/or the technique 1300 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 1200 and/or the technique 1300. The technique 1200 and/or the technique 1300 can be implemented using specialized hardware or firmware. For example, a hardware component configured to perform the technique 1200 and/or the technique 1300. As explained above, some computing devices may have multiple memories or processors, and the operations described in the technique 1200 and/or the technique 1300 can be distributed using multiple processors, memories, or both.

For simplicity of explanation, the techniques 1200 and 1300 are both depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 12, the technique 1200 for multivariate rate control for transcoding video content using a learning model trained for a global corpus of a video hosting platform is shown. At 1202, video data is received for transcoding. The video data is video data of an input video stream uploaded to a server of the video hosting platform, such as for encoding and transcoding. The video data includes one or more video chunks including a current video chunk. Each of the video chunks includes one or more frames. The video chunks of the input video stream may correspond to a same classification of video content or to different classifications of video content.

At 1204, complexity features of the video data are identified. The complexity features include or otherwise refer to video content of the video data, such as objects within video frames, motion information between video frames, artifacts within video frames, and/or other information related to the video content. Identifying the complexity features may include extracting the complexity features of the video data from a pass log of an encoder used for encoding the input video stream. For example, the complexity features themselves may be extracted from the pass log. In another example, information representative of the complexity features may instead be extracted from the pass log and then parsed or otherwise processed to identify the complexity features. Alternatively, identifying the complexity features may include generating feature maps for the video data or otherwise using feature maps generated for the video data. For example, the feature maps may refer to spatial and/or temporal information for the video data. In some implementations, the complexity features may be identified using both of an encoder pass log and one or more feature maps.

At 1206, a trained learning model is used to determine a rate-distortion cluster prediction for the video data. The learning model is trained based on a corpus of the video hosting platform to predict rate-distortion behavior of video data uploaded to the video hosting platform. In particular, the learning model is trained to process the complexity features of the video data of the input video stream to determine which of a number of rate-distortion clusters the video data corresponds to. That is, the learning model is trained to classify the complexity features of the video data into one of a number of rate-distortion clusters produced for the corpus of the video hosting platform. Each rate-distortion cluster of the plurality of rate-distortion clusters thus corresponds to a different rate-distortion classification of the corpus of the video hosting platform.

Determining the rate-distortion cluster prediction for the video data based on the one or more complexity features thus includes identifying a rate-distortion classification for the video data. A correspondence between a rate-distortion cluster and the video data is determined based on a correspondence between the rate-distortion classification of the video data and the rate-distortion classification of the rate-distortion cluster. For example, the rate-distortion classification of the video data can be compared to rate-distortion classifications of the various clusters to identify the cluster to which the video data corresponds. Implementations and examples for training the learning model used for determining the rate-distortion cluster prediction are described below with respect to FIG. 13.

At 1208, transcoding parameters are selected for transcoding the video data based on the rate-distortion cluster prediction. The transcoding parameters are parameters selected as corresponding to optimal bitrate and distortion operating points for a centroid curve for a rate-distortion cluster corresponding to the rate-distortion cluster prediction corresponding to the video data. The centroid curve represents a rate-distortion curve modeled as a center point for the rate-distortion cluster. The operating points of the centroid curve describe various bitrate allocation values for video data. Selecting the transcoding parameters for transcoding the video data thus includes identifying, as an optimal operating point, an operating point along the centroid curve at which the total weighted bitrate is minimized subject to quality constraints. At 1210, the video data is transcoded according to the transcoding parameters.

In some implementations, the technique 1200 may further include verifying the selection of the transcoding parameters. Verifying the selection of the transcoding parameters can include determining whether the transcoding of the video data using the transcoding parameters is in accordance with one or more transcoder constraints. Responsive to a determination that the transcoding of the video data using the transcoding parameters is not in accordance with the one or more transcoder constraints, different transcoding parameters can be selected for transcoding the video data. Alternatively, responsive to a determination that the transcoding of the video data using the transcoding parameters is in accordance with the one or more transcoder constraints, the transcoding may continue using the selected transcoding parameters; otherwise, to the extent the transcoding has already completed, the transcoding is not repeated using different transcoding parameters.

The verification can be performed at different times depending on the structure of the encoder used in connection with the transcoding of the video data. For example, during two-pass encoding, the complexity features of the video data can be identified after a first pass encoding by the encoder, such as from the pass log of the encoder, and the verification of the selection of the transcoding parameters can be performed before a second pass encoding by the encoder. In another example, during one-pass encoding, the complexity features of the video data can be identified for the video data after the single pass encoding by the encoder, such as from the pass log of the encoder, and the verification of the selection of the transcoding parameters can be performed before a single pass encoding by the encoder for next video data of the input video stream, such as to apply the transcoding parameters to that next video data.

In some implementations, the technique 1200 may omit determining a rate-distortion cluster for the video data to be transcoded. For example, a rate-distortion classification for the video data can be determined directly using the complexity features of the video data, and the learning model may instead be a learning model trained to predict transcoding parameters based on complexity features of videos of a corpus of the video hosting platform rather than based on a centroid curve of a cluster of rate-distortion curves. In some such implementations, selecting the transcoding parameters may thus include comparing a classification of the video data against classifications of rate-distortion curves modeled for different videos of the corpus of the video hosting platform, and using the parameters which the learning model has mapped to that rate-distortion classification.

Referring first to FIG. 13, the technique 1300 for training a learning model for multivariate rate control for transcoding video content using a global corpus of a video hosting platform is shown. At 1302, a training data set is received. The training data set includes training video data from at least some of the videos within the corpus of the video hosting platform. In some implementations, the training data set may further include statistics collected, such as from a pass log of an encoder used to previously encode the respective videos of the corpus of the video hosting platform or from feature maps generated for those respective videos. For example, the statistics included in the training data set may include or refer to complexity features of the corresponding video content, such as video frame objects, motion, artifacts, and/or other information.

At 1304, rate-distortion curves are determined for the video data of the training data set. The rate-distortion curves are produced by transcoding the video data using different sets of transcoding parameters and charting the change in bitrate and distortion tradeoff for the video data as results from the different sets of transcoding parameters. In particular, the rate-distortion curves are determined using rate features computed based on a constraint of limiting an operating range for maximum and minimum quality control metric values. The limits to the operating range are defined based on the corpus of the video hosting platform. The rate features are extracted for unsupervised learning, such as to identify optimal bitrate and distortion tradeoff values for the video data along the rate-distortion curves.

At 1306, the rate-distortion curves are clustered to produce rate-distortion clusters. The rate-distortion curves are clustered based on similarities in complexity features of the video data of the training data set. Producing the rate-distortion clusters can include modeling the rate-distortion curves using, for each of the rate-distortion curves, a first bitrate at which a minimum quality control metric value is achieved, a second bitrate at which a maximum quality control metric value is achieved, and multiple operating points which capture a shape of the rate-distortion curve. For example, each of the multiple operating points may correspond to a different quantization parameter, in which the use of the different quantization parameters results in changes in noticeable quality for the video data of the training data set. The particular number of rate-distortion clusters produced is empirically determined based on variations in rate-distortion characteristics across the corpus of the video hosting platform. Thus, a rate-distortion cluster is produced for each classification of video content, in which the classifications of video content are identified based on the variations in rate-distortion characteristics.

At 1308, a centroid curve is determined for each of the rate-distortion clusters. The centroid curve for a given rate-distortion cluster may be determined by computing an average of the operating points and/or other rate features along some or all rate-distortion curves used to produce the given rate-distortion cluster. Alternatively, the centroid curve for a given rate-distortion cluster may be determined by computing a median of the operating points and/or other rate features along some or all rate-distortion curves used to produce the given rate-distortion cluster. Other approaches for calculating the centroid curve are also possible, such as by approximating and/or scaling operating points for some or all of the rate-distortion curves used to produce the given rate-distortion cluster.

At 1310, optimal bitrate and distortion operating points are determined for the centroid curves of the rate-distortion clusters. The optimal operating points for a centroid curve of a rate-distortion cluster refer to the optimal bitrate allocation values to use for transcoding video data commonly classified with the rate-distortion cluster. Determining the optimal operating points for the centroid curve of a rate-distortion cluster can include measuring the bitrate and distortion of video data along the centroid curve to determine values at which the bitrate and distortion meet established transcoding constraints, such as by the bitrate being above a certain value and the distortion being below a certain value. The optimal operating points for the centroid curve of a rate-distortion cluster is later used during the transcoding of video data (e.g., as described with respect to the technique 1200 shown in FIG. 12) to select transcoding parameters for transcoding that video data.

In some implementations, the technique 1300 may omit training the learning model using the rate-distortion clustering-based approach described above. For example, the learning model may instead be trained to predict transcoding parameters based on complexity features of videos of a corpus of the video hosting platform. In some such implementations, training the learning model includes modeling and classifying rate-distortion curves for different videos of the corpus of the video hosting platform, and then evaluating operating points along those rate-distortion curves to identify optimal transcoding parameters to select for transcoding videos corresponding to the rate-distortion classification of those rate-distortion curves.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400, the decoder 500, and the transcoder 600, or another encoder, decoder, or transcoder as disclosed herein) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102 can encode content into an encoded video signal and transmit the encoded video signal to the communications device. In turn, the communications device can then decode the encoded video signal. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for transcoding an input video stream, the method comprising:
   receiving the input video stream at a server of a video hosting platform, the input video stream including a current video chunk;
   identifying one or more complexity features of the current video chunk;
   determining, using a learning model trained based on a corpus of the video hosting platform, a correspondence of the current video chunk to a rate-distortion cluster based on the one or more complexity features;
   selecting transcoding parameters for the current video chunk based on operating points of a centroid curve of the rate-distortion cluster; and
   transcoding the current video chunk according to the transcoding parameters,
   wherein the rate-distortion cluster is one of a plurality of rate-distortion clusters identifiable using the learning model, wherein each rate-distortion cluster of the plurality of rate-distortion clusters corresponds to a different rate-distortion classification of videos of the corpus of the video hosting platform, and wherein determining the correspondence of the current video chunk to the rate-distortion cluster based on the one or more complexity features comprises:
   predicting that rate-distortion behavior of the current video chunk is similar to rate-distortion behavior of videos used to produce the rate-distortion cluster based on a rate-distortion classification of the current video chunk and based on a rate-distortion classification of video content to which the rate-distortion cluster corresponds.

2. The method of claim 1, wherein determining the correspondence of the current video chunk to the rate-distortion cluster based on the one or more complexity features comprises:
   identifying the rate-distortion classification of the current video chunk.

3. The method of claim 1, further comprising:
   training the learning model to predict rate-distortion behavior of video data using videos within the corpus of the video hosting platform.

4. The method of claim 3, wherein training the learning model to predict the rate-distortion behavior of the video data using the videos within the corpus of the video hosting platform comprises:
   receiving a training data set including training video data from at least some of the videos within the corpus of the video hosting platform;
   determining rate-distortion curves for the training video data; and
   producing rate-distortion clusters by clustering the rate-distortion curves based on similarities of complexity features of the training video data.

5. The method of claim 4, further comprising:
   determining a centroid curve for each of the rate-distortion clusters, wherein the centroid curve determined for each of the rate-distortion clusters includes a number of operating points, wherein each operating point represents a bitrate available for transcoding and a quality resulting from using the bitrate.

6. The method of claim 5, wherein selecting the transcoding parameters for the current video chunk based on the operating points of the centroid curve of the rate-distortion cluster comprises:
   identifying, as an optimal operating point, one of the number of operating points of the centroid curve; and
   selecting, as the transcoding parameters, parameters corresponding to the optimal operating point.

7. The method of claim 1, wherein identifying the one or more complexity features of the current video chunk comprises:
   extracting the one or more complexity features of the current video chunk from a pass log of an encoder used for encoding the input video stream.

8. The method of claim 7, wherein the pass log is received after a first pass encoding by the encoder, the method further comprising:
   verifying the selection of the transcoding parameters before a second pass encoding by the encoder.

9. The method of claim 8, wherein verifying the selection of the transcoding parameters before the second pass encoding by the encoder comprises:
   determining whether the transcoding of the current video chunk using the transcoding parameters is in accordance with one or more transcoder constraints; and
   responsive to a determination that the transcoding of the current video chunk using the transcoding parameters is not in accordance with the one or more transcoder constraints, causing a selection of different transcoding parameters for transcoding the current video chunk.

10. An apparatus for transcoding an input video stream, the apparatus comprising:
- a server of a video hosting platform, the server including a memory and a processor, wherein the processor is configured to execute instructions stored in the memory to:
- determine one or more complexity features of video data of the input video stream;
- determine, using a learning model trained based on a corpus of the video hosting platform, a correspondence of the video data to a rate-distortion cluster based on the one or more complexity features of the video data; and
- transcode the video data according to transcoding parameters selected based on operating points of a centroid curve of the rate-distortion cluster,
- wherein the rate-distortion cluster is one of a plurality of rate-distortion clusters identifiable using the learning model, wherein each rate-distortion cluster of the plurality of rate-distortion clusters corresponds to a different rate-distortion classification of videos of the corpus of the video hosting platform, and wherein the instructions to determine the correspondence of the video data to the rate-distortion cluster based on the one or more complexity features of the video data include instructions to:
  - predict that rate-distortion behavior of the video data is similar to rate-distortion behavior of videos used to produce the rate-distortion cluster based on a rate-distortion classification of the video data and based on a rate-distortion classification of video content to which the rate-distortion cluster corresponds.

11. The apparatus of claim 10, wherein the instructions include instructions to:
- train the learning model to predict rate-distortion behavior using a training data set including at least some videos within the corpus of the video hosting platform.

12. The apparatus of claim 11, wherein the instructions to train the learning model to predict the rate-distortion behavior using the training data set including the at least some videos within the corpus of the video hosting platform include instructions to:
- determine rate-distortion curves for video data of the training data set;
- produce rate-distortion clusters by clustering the rate-distortion curves based on similarities of complexity features of video data of the training data set; and
- determine a centroid curve for each of the rate-distortion clusters, wherein the centroid curve determined for each of the rate-distortion clusters includes a number of operating points, wherein each operating point represents a bitrate available for transcoding and a quality resulting from using the bitrate.

13. The apparatus of claim 12, wherein a number of the rate-distortion clusters produced is empirically determined based on variations in rate-distortion characteristics across the corpus of the video hosting platform.

14. The apparatus of claim 10, wherein the instructions to determine the one or more complexity features of the video data of the input video stream include instructions to:
- derive the one or more complexity features from an encoder pass log.

15. The apparatus of claim 10, wherein the instructions to determine the one or more complexity features of the video data of the input video stream include instructions to:
- derive the one or more complexity features from one or more feature maps generated for the input video stream.

16. A transcoder for transcoding an input video stream, the transcoder comprising:
- a rate-distortion predictor stage configured to determine complexity features of video data of the input video stream and to determine, using a learning model trained based on a corpus of a video hosting platform, a correspondence of the video data of the input video stream to a rate-distortion cluster based on the complexity features; and
- a rate-distortion optimizer stage configured to select transcoding parameters for transcoding the video data of the input video stream based on the rate-distortion cluster, wherein the transcoding parameters are defined based on an operating point along a rate-distortion curve corresponding to the rate-distortion cluster,
- wherein the rate-distortion cluster is one of a plurality of rate-distortion clusters identifiable using the learning model, wherein each rate-distortion cluster of the plurality of rate-distortion clusters corresponds to a different rate-distortion classification of videos of the corpus of the video hosting platform, and wherein the rate-distortion predictor stage is configured to determine the correspondence of the video data of the input video stream to the rate-distortion cluster based on the complexity features by:
  - predicting that rate-distortion behavior of the video data of the input video stream is similar to rate-distortion behavior of videos used to produce the rate-distortion cluster based on a rate-distortion classification of the video data of the input video stream and based on a rate-distortion classification of video content to which the rate-distortion cluster corresponds.

17. The transcoder of claim 16, wherein the rate-distortion predictor stage is further configured to train the learning model using a training data set including video data of the corpus of the video hosting platform by determining rate-distortion curves for the training data set and producing rate-distortion clusters by clustering the rate-distortion curves based on complexity features of the training data set, wherein the rate-distortion cluster for the video data of the input video stream corresponds to one of the rate-distortion clusters.

18. The transcoder of claim 17, wherein the transcoding parameters are selected for the input video stream at the rate-distortion optimizer stage to minimize a total or an average of bitrates used for transcoding videos of the corpus of the video hosting platform subject to quality constraints associated with the rate-distortion clusters.

19. The transcoder of claim 16, wherein the rate-distortion curve is a centroid curve determined for the rate-distortion cluster, wherein the centroid curve includes a number of operating points each representing a bitrate available for transcoding and a quality resulting from using the bitrate.

20. The transcoder of claim 19, wherein the operating point based on which the selected transcoding parameters are defined is identified as an optimal operating point along the centroid curve.

* * * * *